Figure 14:
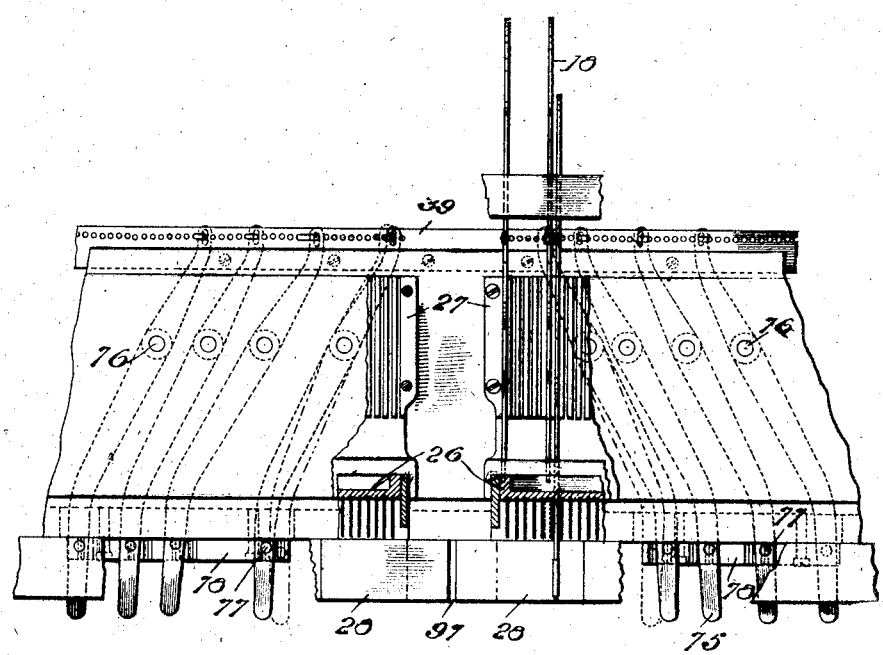

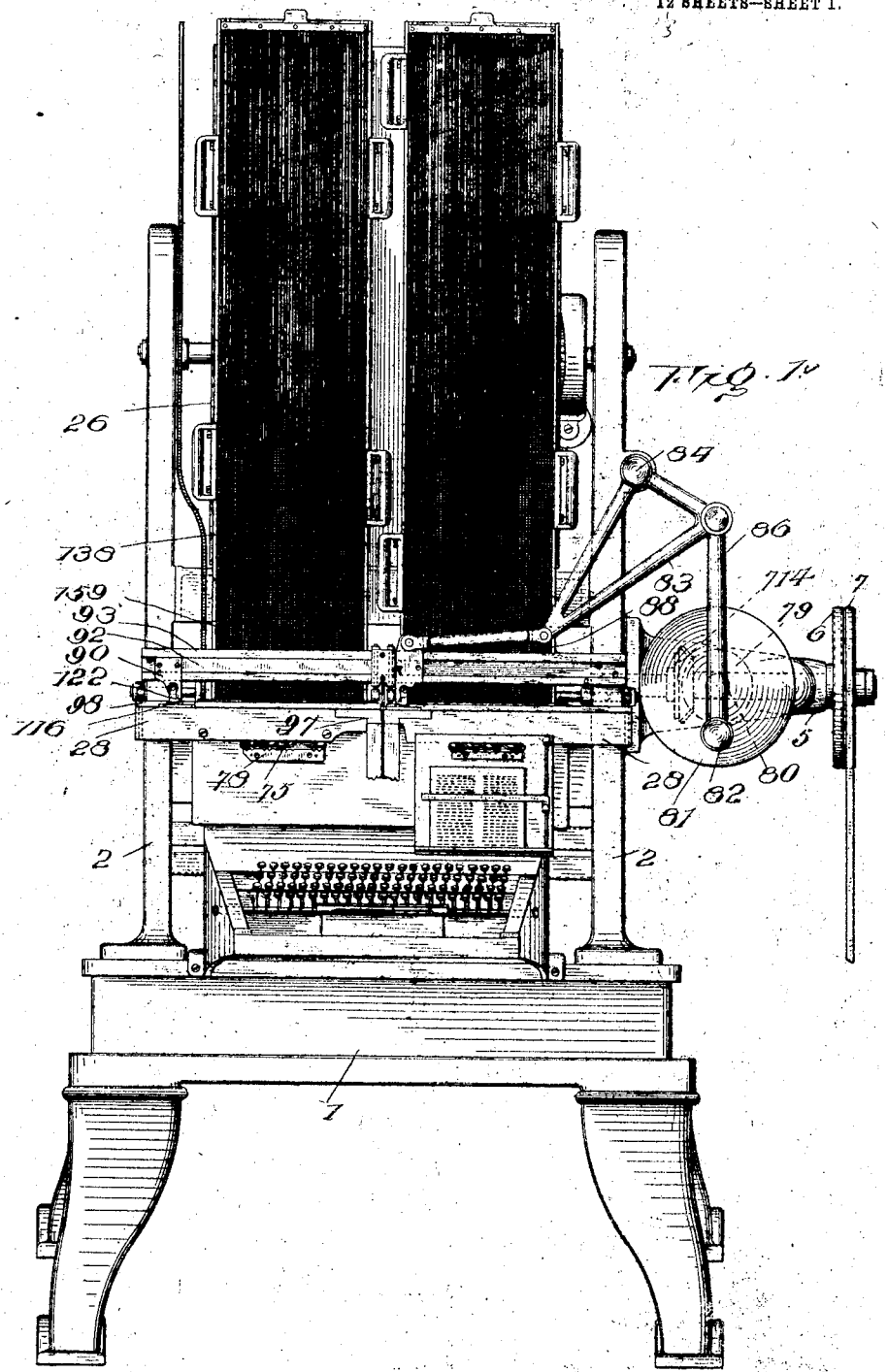

No. 833,957. PATENTED OCT. 23, 1906.
A. DOW.
TYPE SETTING MACHINE.
APPLICATION FILED JULY 2, 1902. RENEWED OCT. 23, 1905.
12 SHEETS—SHEET 2.
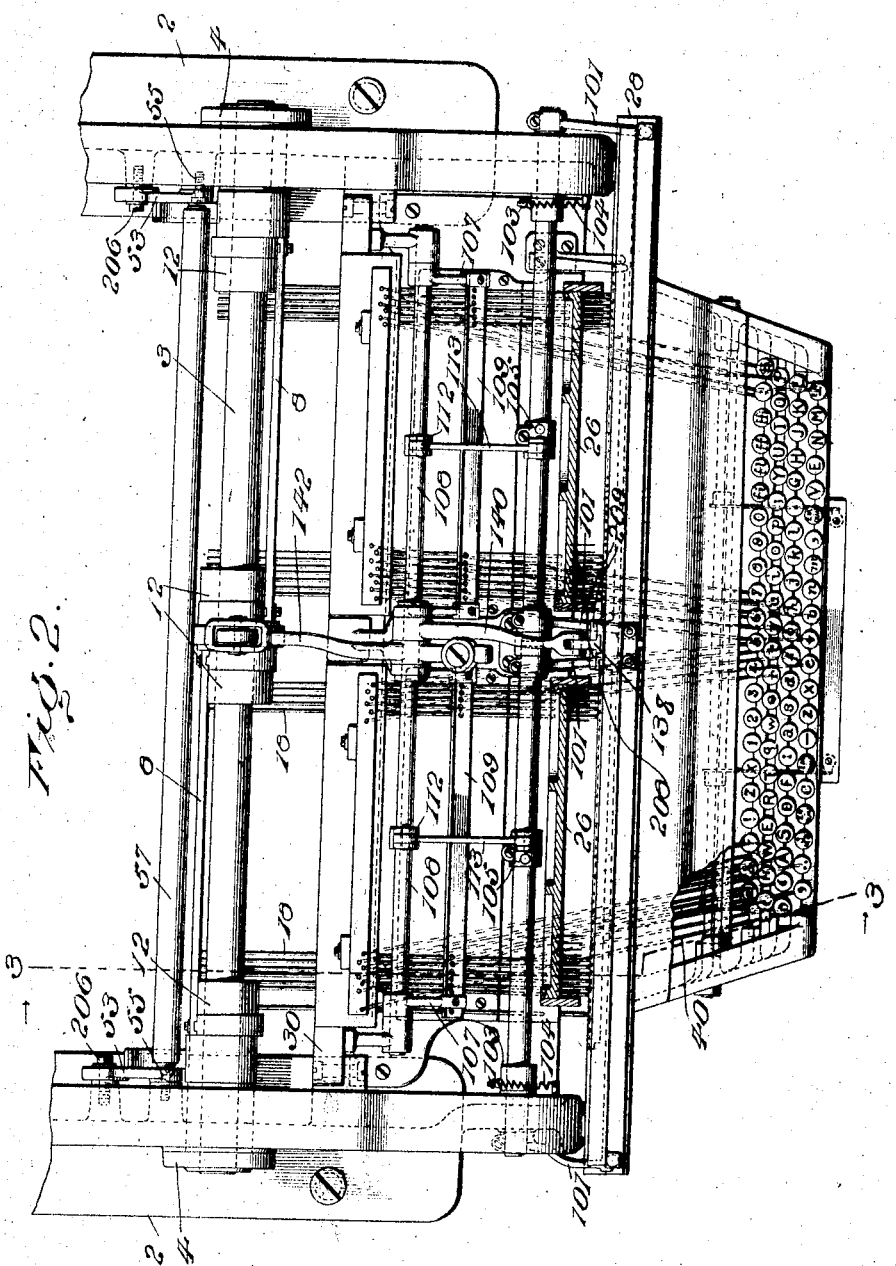
WITNESSES: INVENTOR.
E. R. Berkeley Alexander Dow.
BY
ATTORNEYS No. 833,957. PATENTED OCT. 23, 1906.
A. DOW.
TYPE SETTING MACHINE.
APPLICATION FILED JULY 2, 1902. RENEWED OCT. 23, 1905.
12 SHEETS—SHEET 3.
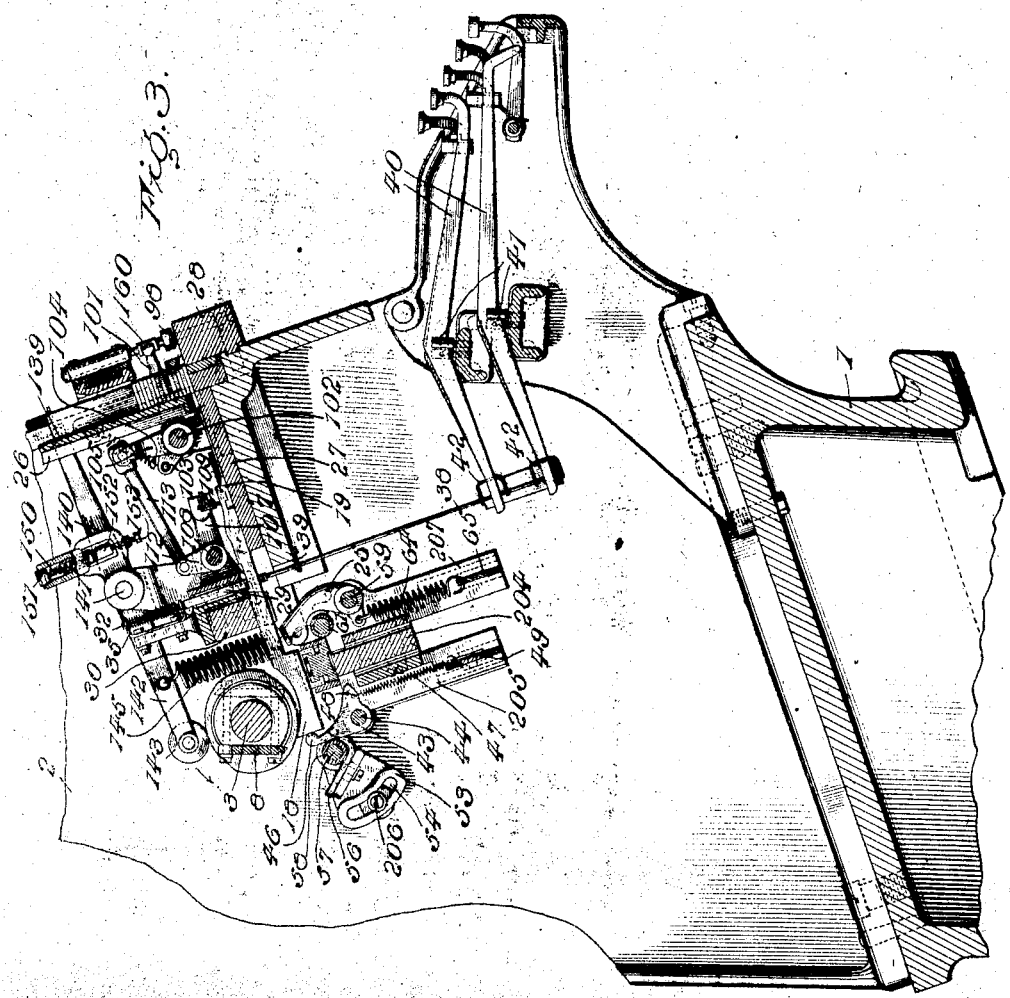
Witnesses
Inventor
Alexander Dow.
By his Attorneys

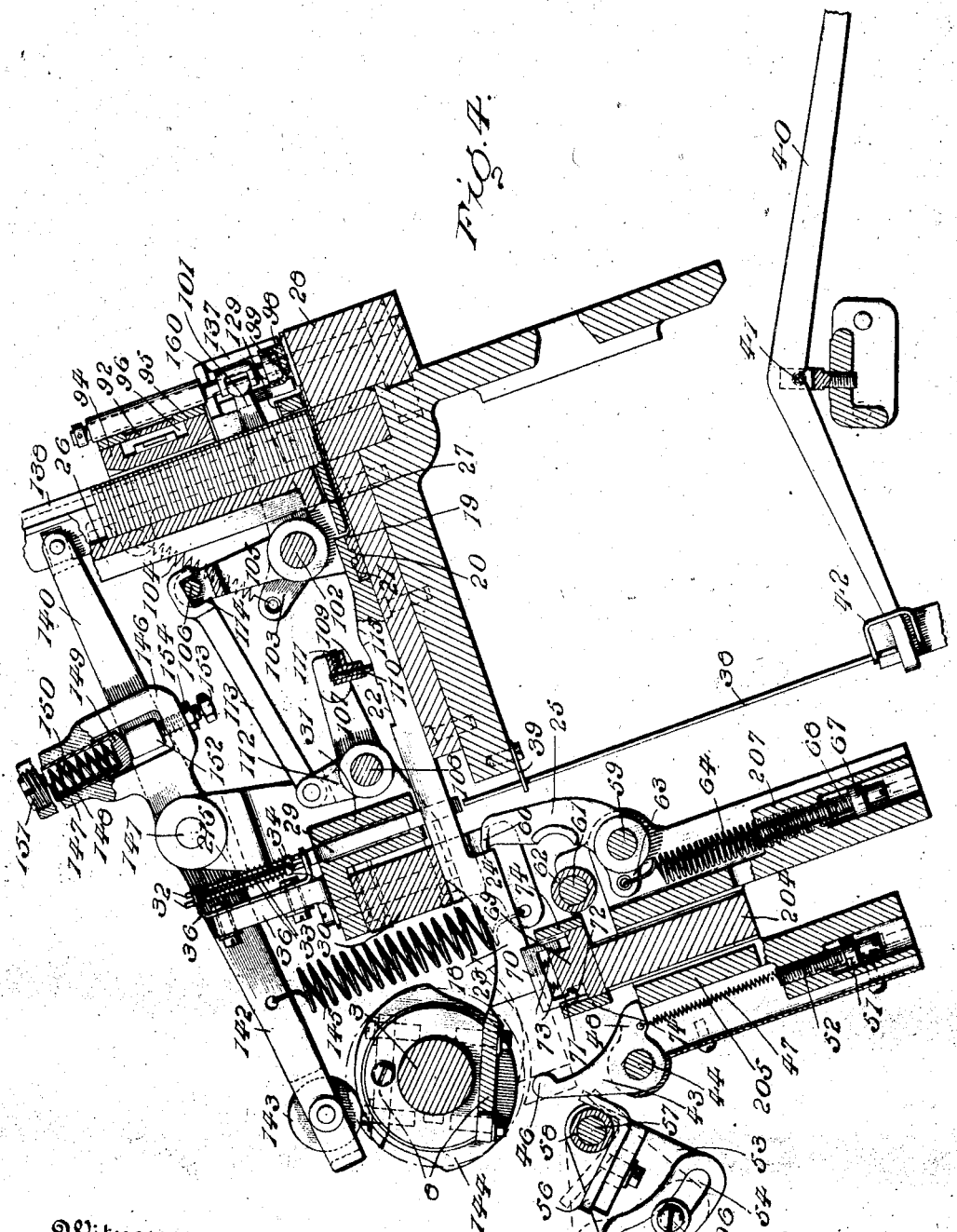

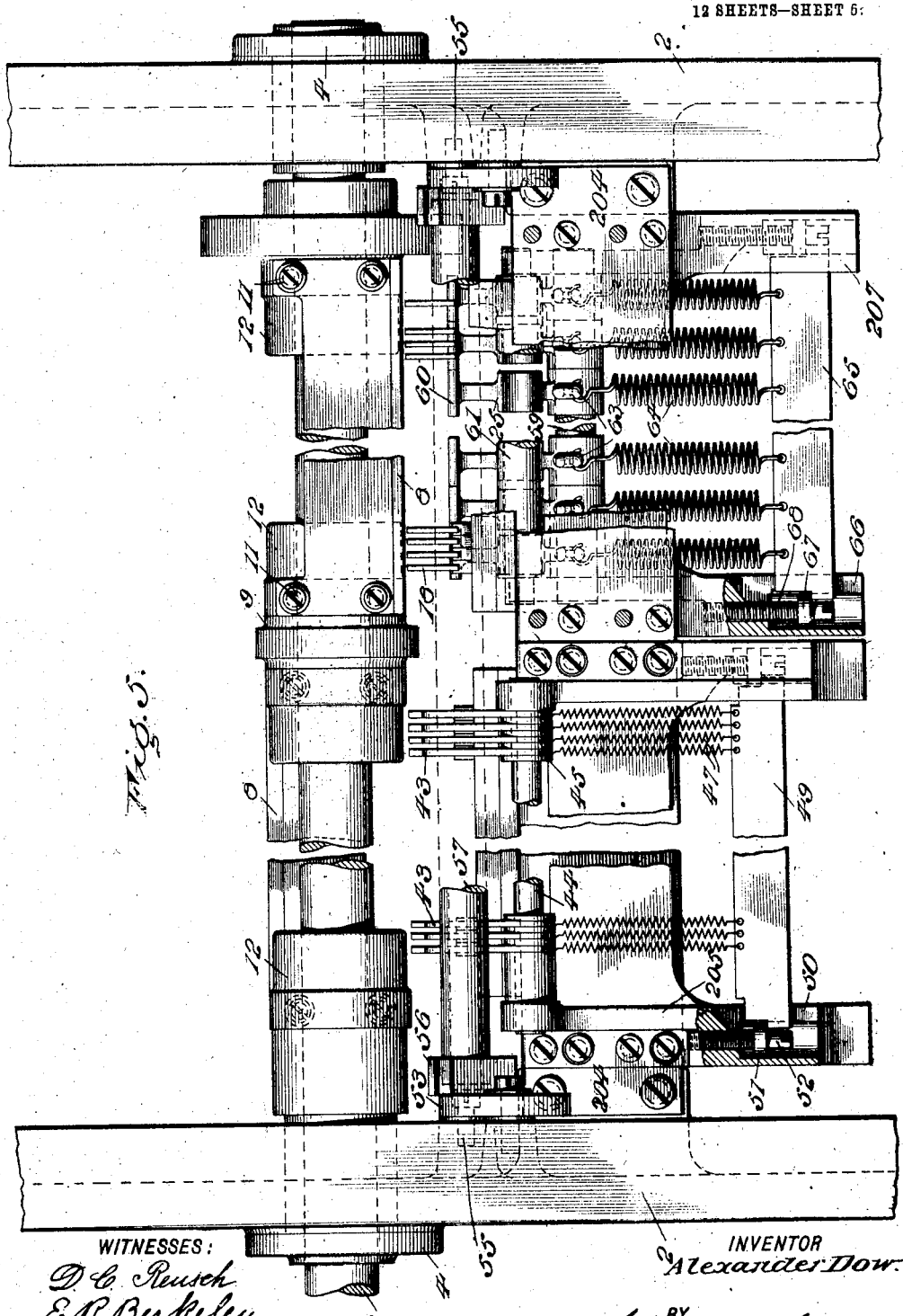

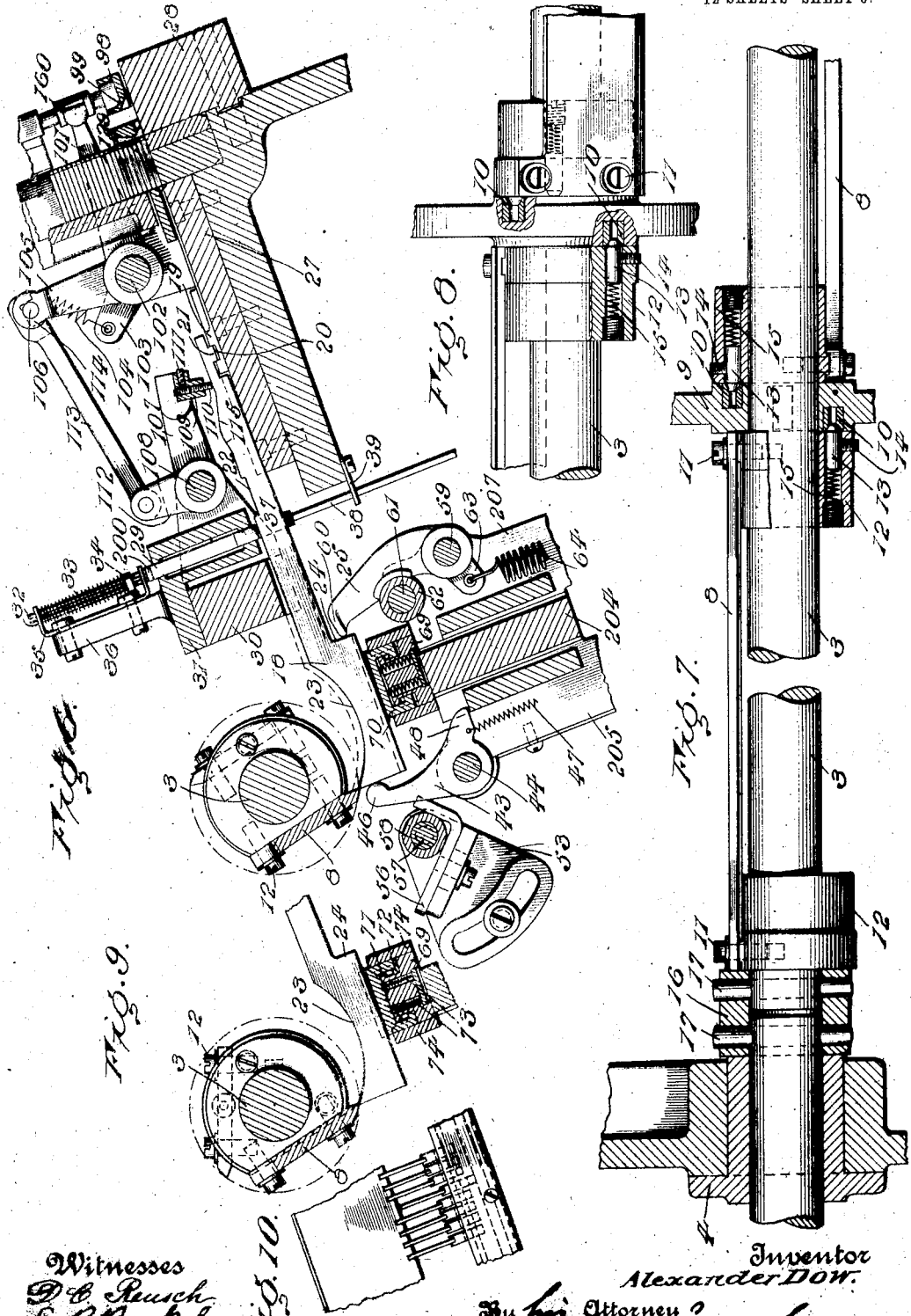

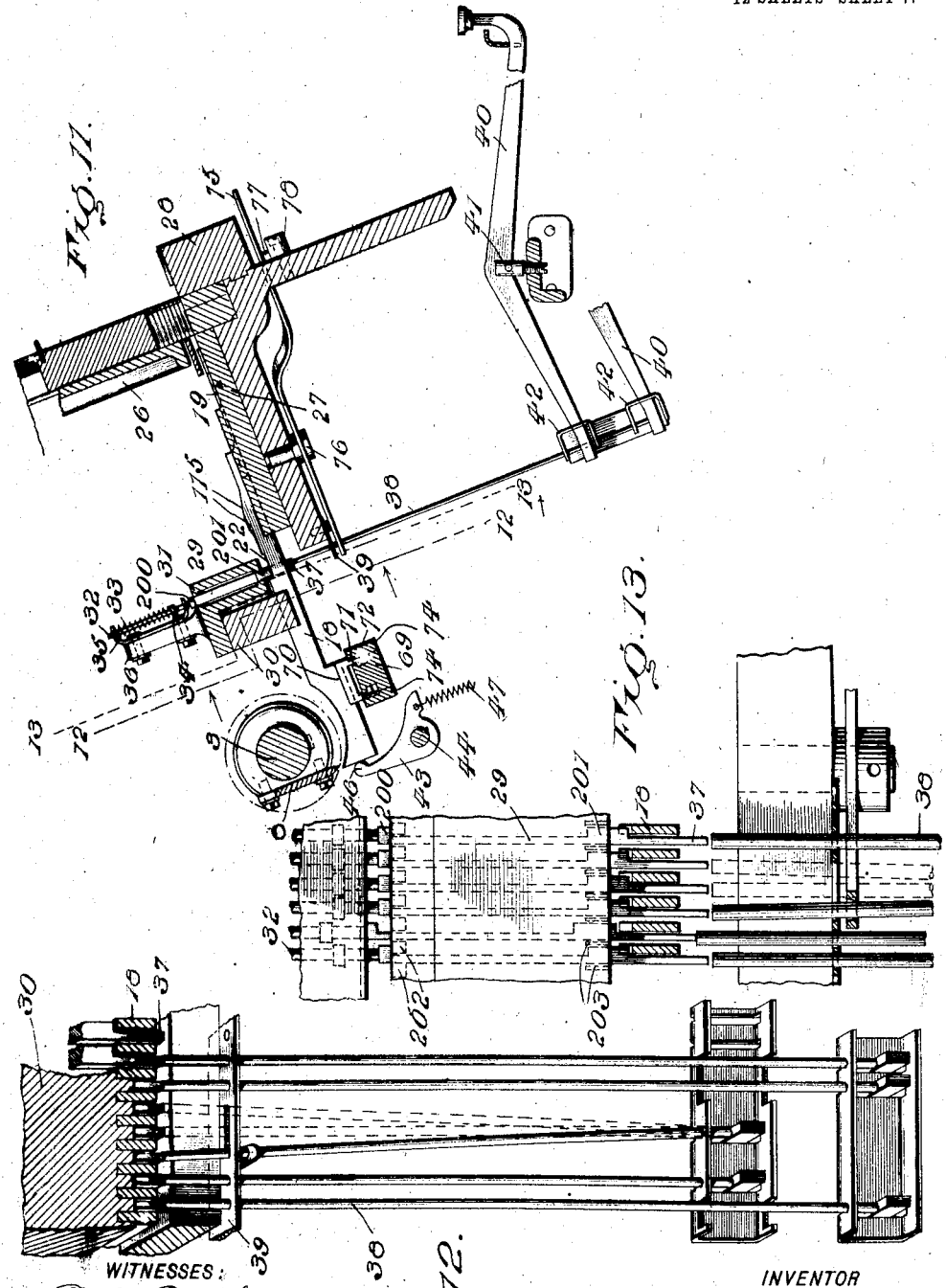

No. 833,957. PATENTED OCT. 23, 1906.
A. DOW.
TYPE SETTING MACHINE.
APPLICATION FILED JULY 2, 1902. RENEWED OCT. 23, 1905.

12 SHEETS—SHEET 8.

Witnesses
Inventor
Alexander Dow.
By his Attorney

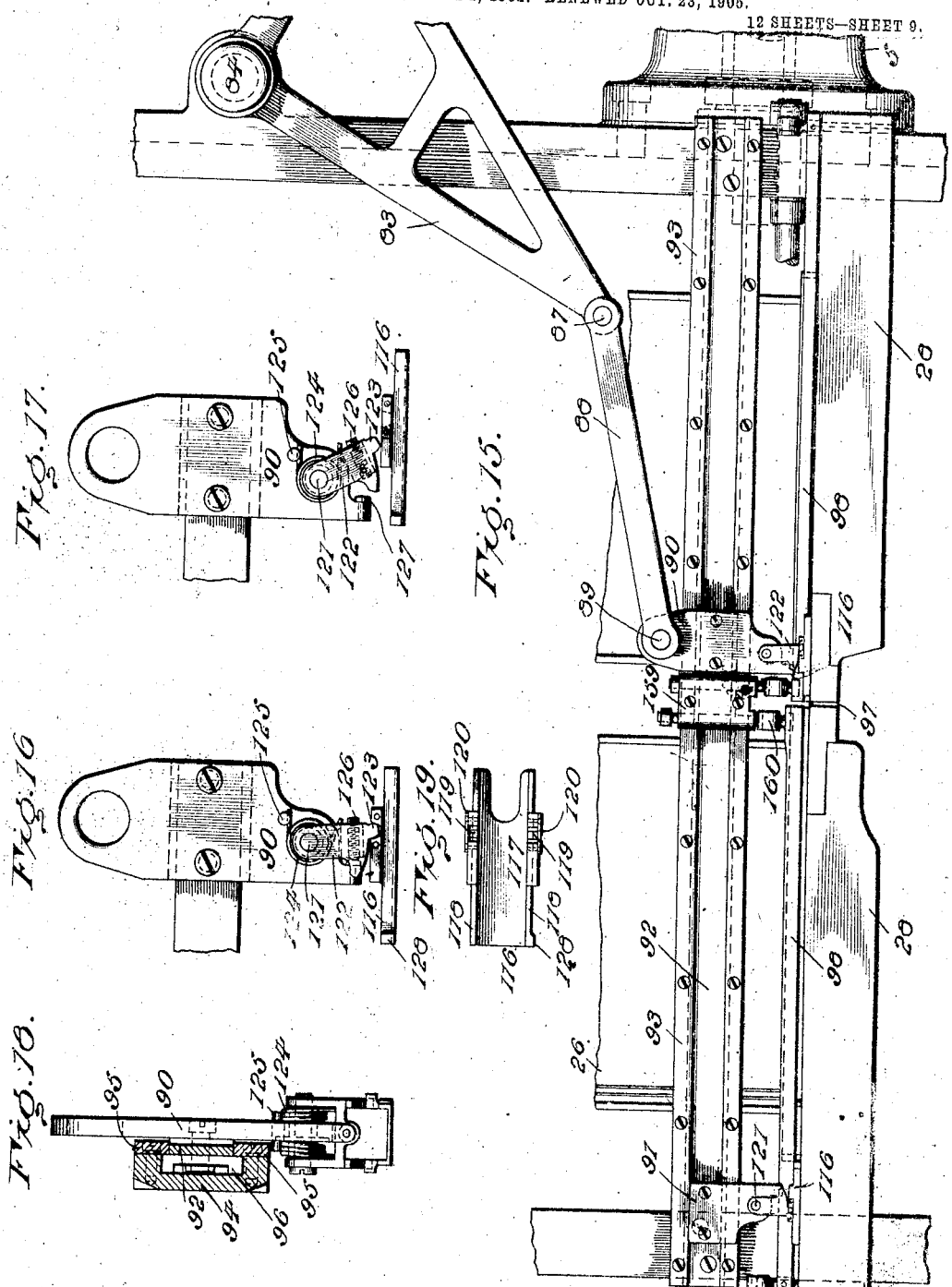

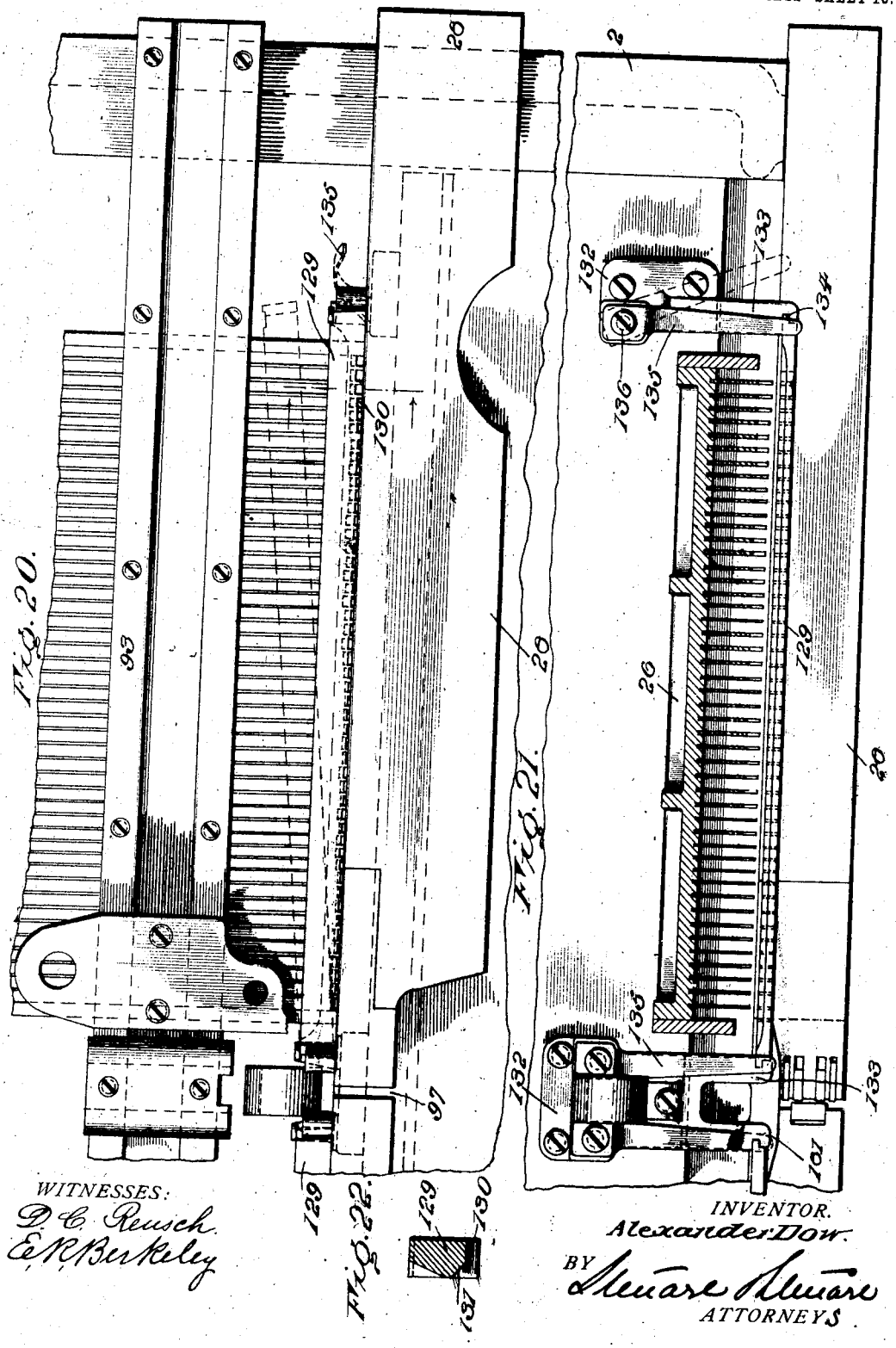

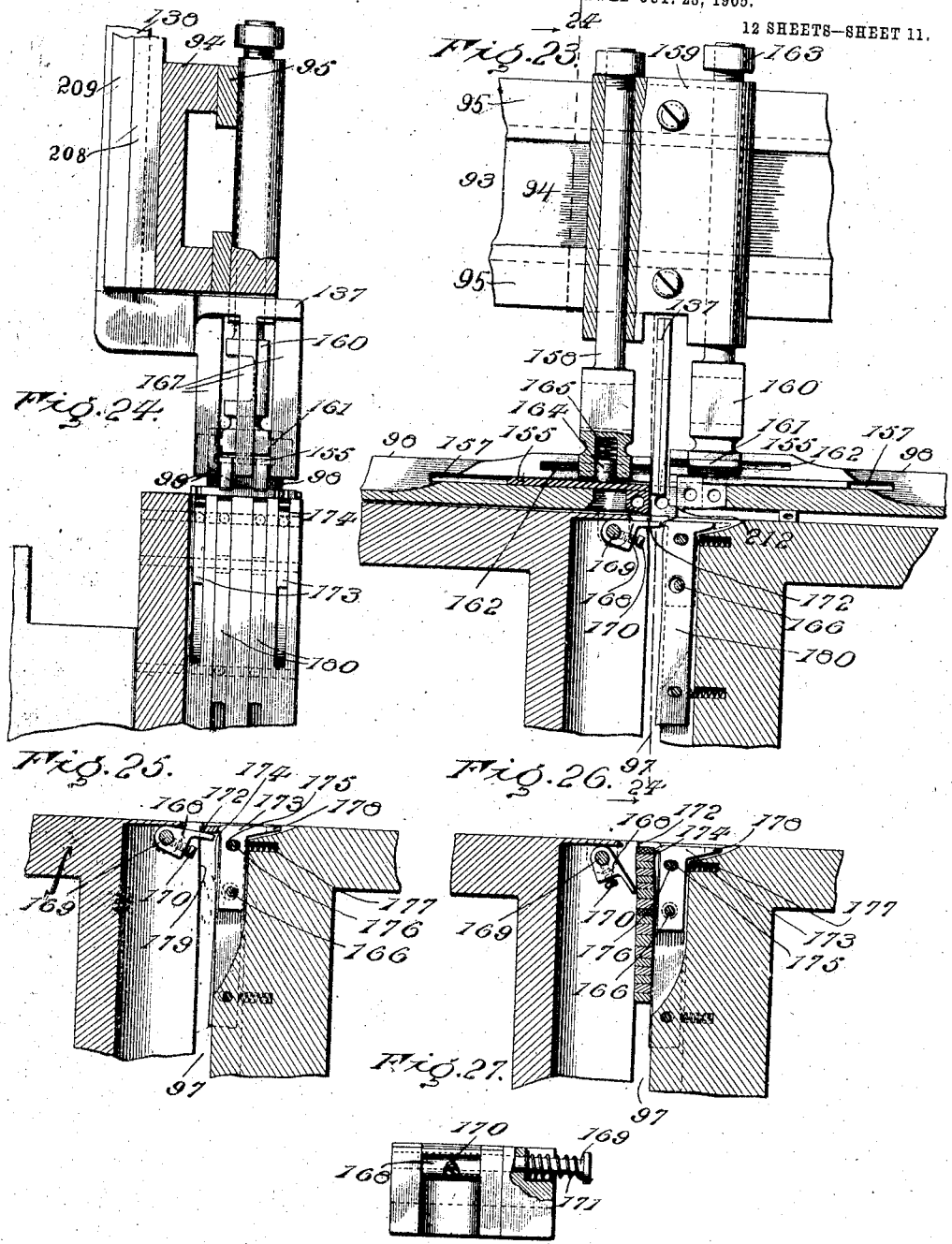

No. 833,957. PATENTED OCT. 23, 1906.
A. DOW.
TYPE SETTING MACHINE.
APPLICATION FILED JULY 2, 1902. RENEWED OCT. 23, 1905.
12 SHEETS—SHEET 12.
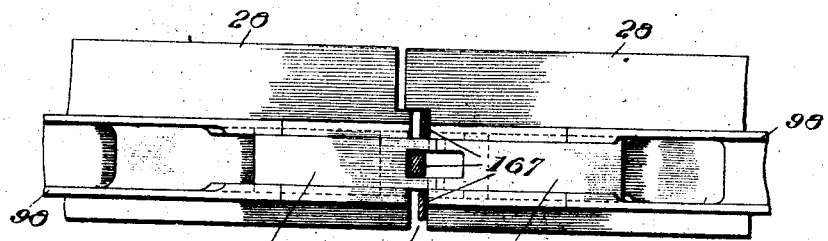
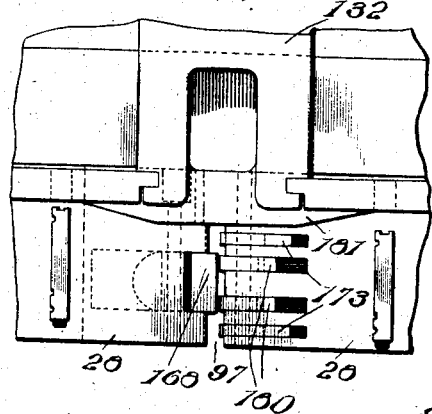
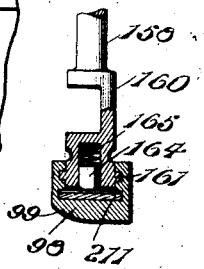
WITNESSES:
E. R. Berkeley
Geo. W. Snyder Jr.
INVENTOR.
Alexander Dow,
BY
Stewart & Stewart
ATTORNEYS

UNITED STATES PATENT OFFICE.

ALEXANDER DOW, OF NEW YORK, N. Y.

TYPE-SETTING MACHINE.

No. 833,957. Specification of Letters Patent. Patented Oct. 23, 1906.

Application filed July 2, 1902. Renewed October 23, 1905. Serial No. 284,033.

*To all whom it may concern:*

Be it known that I, ALEXANDER DOW, a citizen of the United States of America, residing at Park Row Building, city of New York, and State of New York, have invented certain new and useful Improvements in Type-Setting Machines, of which the following is a specification.

My invention relates to that class of machines known as "composing-machines;" and, broadly, it relates to a machine wherein movable printers' type, matrices, or other suitable devices are set in a line, and it is immaterial for the scope of this invention what is done with a line after it has been so set. If movable printers' type be used, the same may be transferred to a justifying mechanism or be justified by hand. If matrices be used, the same may be transferred to any suitable type-casting or line-casting mechanism.

In the following specification and claims I shall use the term "type;" but I desire to have it understood that by this term I mean to include matrices or any other character-carrying or character-forming device that might be used in connection with my machine.

The machine shown in this application is of the same general type as that shown in my prior patent, No. 637,858, November 28, 1899, and has many features in common therewith. For instance, each machine has two type-cases. In front of the lower ends of each type-case there is a raceway onto which type are ejected from the channels in the cases and by means of reciprocating drivers are swept along the raceways to a receiving-channel which is located between the adjacent of the raceways, the type being forced into the receiving-channel by a reciprocating type-depressor. Furthermore, there is located immediately above each raceway a friction-bar which bears on the type as the type are swept along the raceway, the friction-bar being raised by a forcer a distance corresponding to the width of the type which is ejected by a forcer, so that the friction-bar is raised varying distances for the various widths of type. There are many other points of similarity between the machines which it is not believed necessary to specifically point out at this time.

More specifically, my invention relates to that class of composing-machines shown in my prior patent, and while I have shown my improvements as embodied in a machine constructed on the lines of my prior patent referred to it is to be understood that I am not to be limited to the use of my improvements in connection with such form of machine, as they are equally well adapted to use in any other machine in which they may be found desirable.

The object of my invention is to improve the mechanism shown and described in my prior patent so that it will operate with more certainty, more rapidly, and more easily than heretofore.

With these ends in view my invention consists in various details of construction, one of which is that the type-forcers are not actuated at all by the depression of the keys, but each key merely acts to release a lock and allow the type-forcers to be actuated by other mechanism in the machine. By so doing I have been enabled to reduce the distance which the key must be depressed very materially and also to greatly lessen the power necessary to depress a key.

Another feature of my invention is in so securing the wing-cam which drives the type-forcer to its shaft that the cam will be released from the shaft when the cam meets abnormal resistance.

Another feature of my invention is an improvement in the guides for the type-forcers and the means for mounting them.

Another is in the means for connecting the shoes with the type-drivers, whereby should the shoes meet with abnormal resistance they will be released from the drivers.

Another is in the dogs which position the type over the assembling-channel.

Another is in the construction of the type-receiving throat.

Another is in what I term the "comb," through which the type pass and by which they are guided from the cases to the raceway, and also in the means for mounting this comb.

Another is in the improvements in the means for shifting the connections between the keys and the type-forcers, whereby the connections can be shifted so that the keys will operate to eject type from any one of a plurality of channels.

Another is in the means for forcing the type forward over the raceway while the type are being swept along the raceway to a position where they may be depressed into the type-receiving channel.

The invention also consists in other details of construction, which will be first specifically described and then pointed out in the claims.

Referring to the drawings, wherein like reference-numerals are used to designate the same part wherever it occurs, Figure 1 is a front elevation of a type-setting machine embodying my invention. Fig. 2 is a plan view thereof with the type-cases in horizontal section cut by a plane above the other mechanism. Fig. 3 is a sectional view taken on line 3 3 of Fig. 2, a forcer being shown in its normal position. Fig. 4 is a view similar to Fig. 3, showing a forcer at the limit of its forward movement and also showing in dotted lines two positions of the forcer—that is, at its normal position and the position it assumes after it has been released and given its initial movement. Fig. 5 is a rear elevation with some parts broken away and some parts omitted to more clearly show the construction. Fig. 6 shows the position a forcer assumes when the rear end of the forcer and the wing can make what is termed a "shear." Fig. 7 is a view, partly in horizontal section, showing the wing-cams and the means for securing them to the shaft and the safety device by which they may be released when they meet abnormal resistance, the parts being shown in their normal position. Fig. 8 is a view showing one of the wing-cams released from the shaft. Fig. 9 is a sectional view of one of the wing-cams and its shaft, showing the position of the cams when one of them has yielded and also showing a forcer in the position which necessitates the yielding of the cam. Fig. 10 is a rear view of the parts shown in Fig. 9. Fig. 11 is a vertical longitudinal section of the isolated parts, showing a shifting-lever. Fig. 12 is a rear perspective view of a detail, partly in section, on line 12 12 of Fig. 11, showing the device for shifting the key-rod from one forcer to another. Fig. 13 is a rear detail view taken on line 13 13 of Fig. 11. Fig. 14 is a plan view of Fig. 11 with some parts broken away and some parts omitted, the type-cases being in section. Fig. 15 is a front view of the raceway and type-drivers. Fig. 16 is a front view of one of the type-drivers and its shoe when in their normal position. Fig. 17 is a front view of the type-driver and shoe, showing the shoe disengaged from the driver. Fig. 18 is an end view of the driver and shoe. Fig. 19 is a plan view of the shoe detached. Fig. 20 is a front elevation of the raceway with the friction-bar removed to show the guide-bar. Fig. 21 is a plan view of the raceway and guide-bar, the type-cases being shown in section. Fig. 22 is a transverse sectional view of the type-guide bar. Fig. 23 is a front elevation, partly in section, showing the parts surrounding the assembling-channel. Fig. 24 is a vertical transverse section of the parts shown in Fig. 23, taken on line 24 24, showing some parts in full. Fig. 25 is a vertical longitudinal section of the parts surrounding the type-assembling channel, showing one type in the channel. Fig. 26 is a similar view to Fig. 25, showing a number of type in the assembling-channel and parts in corresponding position. Fig. 27 is a full view of the left-hand wall of the assembling-channel, showing the shutter in its normal position. Fig. 28 is a plan view of a part of the raceway and dogs, showing the depressor in section. Fig. 29 is a perspective view of one of the dogs. Fig. 30 is a vertical transverse section of the friction-bar, one of the dogs, and the lower end of the supporting-post, which supports the friction-bar and dog and which also carries in its end a spring-pressed pin for depressing the dog. Fig. 31 is a plan view of the parts of the raceway surrounding the assembling-channel, showing the cam-plate for alining the type.

1 is the base of the machine, and 2 2 are uprights extending up from the base 1, and on these uprights the various parts of the mechanism are mounted.

3 is the main driving-shaft, which is journaled in the bearings 4 4 in the uprights 2 2.

5 is a bracket extending out from one of the uprights and forming a bearing for the outer end of the shaft.

6 and 7 are fast and loose pulleys on the shaft 3, by which power is communicated to the machine. Mounted on the main shaft 3 are two wing-cams 8 8, which preferably are mounted on opposite sides of the shaft one hundred and eighty degrees apart. Preferably these wing-cams are secured to the main shaft in the following manner: Secured to the main shaft is a collar 9, which is best shown in Figs. 7 and 8. This collar is provided with the conical sockets 10 10 on each side thereof. The wing-cams or driving-blades 8 8 are secured, by means of screws 11 11, to the pairs of collars 12 12, which are loose on the shaft 3. Mounted in the inner one of each of the pairs of collars 12 12 are the pins 13 13, located parallel to the axis of the shaft and held in position by the screws 14 14. These pins have tapered ends and are adapted to engage the sockets 10 in the collar 9 which are opposite them. These pins are yieldingly held in the sockets by means of springs 15 15, bearing against their rear ends, the springs 15 being held in position by means of suitable screws, as shown. From this construction it will be seen that should one of the wing-cams or driving-blades strike an obstruction offering sufficient resistance the pins 13 will be cammed out of the sockets 10, and consequently the blade will be loosed from its driving connection with the main shaft for a revolution. For convenience of assembling the shaft 3 is made in sections and the sections are united by means of a coupling consisting of a collar 16 and pins 17 17, which pass through holes in the collar and in the abutting ends of the sections of the shaft. The collar 16 also serves to prevent longitudinal movement of the collars 12 12, which carry the wing-cams.

18 designates the forcers, to which are connected the forcer-tips 19, the connection being formed by a notch 20, cut in the forcer-tip, and the projection 21 on the forcer adapted to fit in the notch. Each forcer is also provided with a notch 22, which is adapted to be engaged by a lock 29 to be hereinafter described.

23 is a concave depression in the upper surface of the forcer at the rear end which meets the surface of the rear end of the forcer at an acute angle, making a knife-edge at that point, the purpose of which will be hereinafter stated. This concave surface when the forcer is in its normal position allows the wing-cam 8 when it is rotating to clear the forcer.

24 is a shoulder on the lower edge of the forcer, which is adapted to be engaged by the forcer-return levers 25, which will be hereinafter more specifically described.

26 indicates the type-cases, which may be of any desirable construction and mounted in any desired way. Preferably and as shown these cases are mounted and handled by the mechanism fully described and claimed in my application, Serial No. 114,154, filed July 2, 1902, and I hereby refer to said application for a description of the construction of the case and case-handling mechanism.

27 (see Fig. 14) is a guide for the forcer-tips 19, which move back and forth through the guide and through suitable openings in the bottom of the type-cases to force the lowermost type from the cases on to the raceways 28.

30 is a bar which extends transversely the frame of the machine from frame to frame and secured at its end to the frames 2.

31 31 are two brackets secured to the bar 30 and in each one of which one-half of the locks 29 are mounted in suitable ways cut in the brackets. The locks 29 are each provided with an enlarged head 200 and a projecting lug 201, projecting from the side of the lock some distance back from its lower end, as best shown in Fig. 13.

202 represents lugs carried by the brackets 31, which form the upper portion of the ways for the lug to reciprocate in and also for the shoulders 200 to come in contact with to limit their downward movement.

203 represents a second set of lugs, also carried by the brackets, and forms guides at the lower side of the brackets for the locks. The lugs, as shown, guide that portion of the lock which carries the projecting lugs 201.

32 32 are a series of pins, one for each lock, mounted in the brackets 35. These pins rest on the heads 200 of the locks, and each pin is pressed down by means of a spring 33, held between the collars 34 on the pins and the top of the guiding-brackets 35. These guiding-brackets 35 are secured at their ends to the uprights 36, mounted on the brackets 31. The lower edge of the projecting lugs 201 on each of the locks forms a shoulder which engages the upper surface of the forcer and drops into the notch 22 in the upper surface to lock the forcer. The lower end 37 of each of the locks passes down between the forcers and stands over the rods 38, which are held upright and guided by means of suitable guides 39.

40 designates the key-levers, which are pivoted at 41 with the rear end of each lever directly under one of the rods 38. The rear ends of the levers and the lower ends of the rods 38 are guided by suitable guides 42. It will be seen that by this construction upon a very slight depression of a key a rod will be raised, which will raise the shoulder on the projecting lock 201 of corresponding lock 29 out of a forcer 22 and allow the forcer to be given its initial movement by mechanism which will be presently described.

204 is a cross-brace secured to the side frames 2 2 at its end, and on it are mounted three mechanisms—namely, the devices for giving the initial movement to the forcers, the devices for returning the forcers, and the devices for guiding the forcers.

43 indicates what I term the "initial-movement" levers. These levers are in the form of bell-cranks and are mounted on the stationary shafts 44 44, which are supported in brackets 205, secured to the cross-brace 204, the levers 43 being separated by suitable washers 45. These levers are each provided with a head 46, each of which is adapted to come in contact with the rear end of a forcer.

47 represents a series of springs, one for each lever, one end of which is secured to a projecting arm 48 of the initial-movement lever and the other end of which is secured to plates 49. The ends of the plates 49 are each guided in ways 50 in the lower ends of the brackets 205, through which they project into recesses in the brackets, where they engage heads 51 of the set-screws 52, mounted in the recesses, whereby the blades may be moved toward or away from the levers to increase or diminish the tension of the springs 47, as may be desired.

53 53 are two segmental brackets secured to the inner faces of the side frames 2 2 opposite each other, and these brackets are provided with curved slots 54, the brackets being pivoted to the sides of the frames by screws 55. By means of the screws 206 206, which pass through the curved slots 54 54, the inclination of these brackets may be varied as desired, the curve of the slots being concentric with the pivots 55 to allow this adjustment. Secured to the inner faces of these brackets are L-shaped supports 56, and resting in the L-shaped supports is a cushion-bar 57, preferably covered with rubber or other resilient material 58. This covered bar forms a resilient cushion, against which the initial-movement levers strike when the forcers are returned to their normal position. The forcer-return levers 25 are in the form of bell-cranks which are loosely mounted on the shafts 59 59, each shaft being mounted in brackets 207, secured to the front side of the cross-bar 204. The levers 25 are each provided with a head 60, and preferably this head is of such a width as to engage a plurality of forcers.

61 61 are cushion-bars mounted in open supports on the upper ends of the brackets 207, the bars being preferably covered with rubber or other suitable material 62 to form a cushion for the return-levers 25. The return-levers normally rest against these cushion-bars, with the heads of the levers away from the shoulders 24 of the forcers, so that forcers may be given their initial movement by the levers 43 without the shoulders 24 making contact with the return-levers.

63 represents arms of the return-levers 25, to which are secured springs 64, the other ends of these springs being secured to plates 65 65. The springs 64 of the return-levers are stronger than the springs 47 in order that as soon as the wing-cam has cleared the rear end of a forcer the forcer may be given sufficient momentum to return to its normal position against the tension of the spring 47. The ends of the plates 65 65 are each guided in ways 66 in the lower ends of the brackets 207, through which they project into recesses in the brackets, where they engage heads 67 of the set-screws 68, mounted in the recesses. By means of these screws the plates may be moved a greater or less distance away from the levers 25, and in this way the tension of the spring 64 may be varied as desired.

69 is a bar mounted upon the cross-brace 204, on which are mounted a series of forcer-guides 70, one for each forcer. Preferably and as shown the sides of the bar 69 are undercut to form projecting shoulders 71, and the guides 70 are each provided with inwardly-extending projections 72, which are adapted to take under the shoulders 71 and limit the movement of the guides.

73 represents springs located between the top of the bar 69 and the under sides of the guides 70, which support the guides 70 in their raised position and yet permit them to yield to pressure.

74 represents plates secured to the sides of the bars 69. These plates are provided on their inner faces with a series of transverse grooves which form ways for the forcer-guides to move in, whereby the guides are prevented from becoming laterally displaced.

The upper surface of each forcer-guide is provided with a longitudinal groove in which a forcer is reciprocating. The object of having the guides spring-mounted is to prevent breaking the mechanism should the edge of one of the wing-cams strike squarely upon the rear edge of a forcer-blade in the manner indicated in Fig. 6. When this occurs, as will be clearly seen by reference to this figure, the rear end of the forcer is pressed down and the forward end of the forcer raised, when ordinarily the wing-cam will clear the forcer. If, however, the parts should come in contact in such a way that the wing-cam cannot get by the forcer or get behind the same, then the wing-cam will slip on its shaft, as shown in Figs. 8 and 9.

As in composition type from some of the channels are used oftener than type from others, so that the charge of one channel is exhausted more rapidly than others, I have devised a means whereby type of the same kind may be placed in a plurality of channels, each of the said channels having its own forcer and lock and the rod which connects the key with the lock being so constructed that it may be shifted from one lock to another, whereby when the type in one channel are exhausted by simply shifting the rod a new channel containing the same kind of type as the exhausted channel may be brought into use. I have illustrated the mechanism for accomplishing this result from Figs. 11, 12, 13, and 14. Referring to these figures, 75 75 are a plurality of levers pivoted at 76 to studs projecting from a suitable portion of the under side of the frame. The inner end of each of these levers loosely engages the upper end of one of the rods 38. The forward end of each of the levers 75 carries a dog 77, which is adapted to engage the notches on the upper surface of the plate 78, these notches being cut such a distance apart that by moving a lever so that its dog will move from one notch to the next the rod 38, to which the particular lever moved it attached, will be moved from a position below one of the locks to an operative position below an adjacent lock, and the lock under which the rod stands will be the lock which will be operated upon by the depression of the key which actuates the rod which has been moved. In the form of construction I have shown three channels may be operated by one key by shifting the key-rod in the manner described; but it is to be of course understood that this number may be made more or less, as found desirable.

Mounted on the driving-shaft 3 is a bevel-gear 714, meshing with a bevel-gear 79, mounted on a counter-shaft 80. The shaft 80 carries on its front end a disk 81, and projecting from the face of the disk is a wrist-pin 82.

83 is a bell-crank lever which is pivoted at 84 to the frame of the machine. Connected to the bell-crank lever 83 at 85 is a connecting-rod 86, the other end of which is connected to the wrist-pin 82. Pivoted to the other arm of the bell-crank lever at 87 is the connecting-rod 88, the other end of this connecting-rod being pivoted at 89 to one of the type-drivers 90. 91 designates the other type-driver of identical construction to the type-driver 90, but arranged oppositely, and these two drivers are connected together by the bar 92, so that they will move together.

93 is the guide for the type-drivers, which is composed of a longitudinally-slotted bar 94, to the front face of which are secured the plates 95 by screws or any other suitable means whereby overhanging shoulders are formed. The bar 92 is of a width equal to the distance between the edges of the plates 95 and travels between these inner edges. Secured to the rear side of the bar 92 is a block 96 of the same width as the width of the slot formed in the bar 94. By this means the bar 92 is positively held in position between the ways. Between the raceways 28 I provide a centrally-located channel 97, into which the type are forced and assembled, the type being afterward handled in any desired way, it being entirely immaterial as far as the subject-matter of this application is concerned what is done with the type after they are set up. It will be seen that this centrally-located channel divides the setting mechanism into two identical halves and that the type are swept along the raceways by the drivers from each side of the machine to the central channel.

98 represents a pair of friction-bars, one located over each raceway, and between which and the raceway the type are forced by the ejectors and then carried to the central channel by the drivers. The friction-bars 98 have a rear beveled edge 99, which guides the type into the opening between the friction-bar and the raceway.

160 160 are a pair of posts, there being one pair for each friction-bar, the posts being located at the ends of each bar. Each post is horizontally slotted on its rear side, and engaging these slots are the ends of the levers 101, fast on the shafts 102 102, the shafts 102 being supported in suitable bearings secured to the frame of the machine.

103 103 are rearwardly-projecting arms secured to the shafts 102, and connected to these arms 103 are the springs 104, the other ends of the springs being connected to a suitable part of the frame. The springs normally hold the friction-bars depressed.

105 105 are two levers, one secured to each shaft 102, which preferably and as shown stand up from about the center of each shaft. Each of these levers is provided with a pin 106 near its extremity.

107 107 designate two pairs of arms, which are secured to the shafts 108, and extending between these arms is a plate 109, provided with a series of set-screws 110, one of these set-screws being provided for each of the forcer-blades.

111 designates set-screws which are adapted to be set up against the screws 110 and hold them in their adjusted position. Secured to the shafts 108, in line with the arms 105, are the arms 112, and pivoted to these arms are the hooks 113, provided with notches 114 on their under side at the outer ends, the notches being adapted to take over and engage the pins 106, carried by the arms 105, the notches 114 being somewhat longer than the diameter of the pins 106.

115 is a cam-surface, which is on the upper surface of each of the forcers. These cam-surfaces are of a height proportional to the thickness of the type for which the particular forcer is used.

It will be seen that by the construction just described when any forcer is actuated the arm 107 will be lifted and through the shaft 108 will rock the arm 112, drawing back the hook 113, which through the pin 106 and arm 105 will rock the shaft 102, which will raise the arm 101 and through this arm the friction-bar 98 a distance slightly less than the thickness of the type to be ejected, so that the friction-bar will exert friction on the type while it is being ejected onto the raceway. The cam-surface 115 has an ascending portion, and immediately following the ascending portion a descending portion. The altitude of the cam-surface is so calculated that it will correspond with the thickness of the type for which the particular forcer is used, so that the ascending portion of the cam-surface will raise the friction-bar 98 a distance above the raceway slightly less than the thickness of the type, so that the type when they are ejected by the forcers will meet with a desired resistance as they pass onto the raceway and beneath the friction-bar. It is desirable that the type when entering the raceway should advance a certain distance and no farther. They should advance as far as the forcers press them, but there they should stop. In order to insure this result, the pressure of the friction-bar is increased just before the forcer finishes its stroke. This increase of pressure is accomplished by the descending portion of the cam 115. While the point 110 is ascending the cam 115, the hook 113 is drawing and holding the friction-bar up. As soon as the point 110 begins to descend the descending portion of the cam, the hook 113 will ride forward on the pin 106, which action is permitted because the notch 114 is longer than the diameter of the pin. This will release all the parts which have raised the friction-bar and allow the spring 104 to exert its full pressure upon the friction-bar and upon the type, stopping the type in the position to which the forcers have forced them and in place to be 180 represents a pair of spring-pressed friction-plates which are mounted in the same side of the channel as the plates 173, as clearly shown in Fig. 23. The friction-plates 180 are preferably provided with a curved bearing-face which is convex at the upper portion of the face and concave at the lower portion. This curved bearing-face is for the purpose of preventing the bottom type from falling when there are a plurality of type in the channel, and the curve of these faces corresponds with the curve of the shutter side of the channel; but the curve of the faces of the plates is of a slightly shorter radius than the curve of the shutter side of the channel. If the edges of the receiving-channel formed between the stationary side 129 and the friction-plates 180 were parallel, the bottom type after it had passed the center of the friction-plates 180 would only be held by the friction between the side of the type and the face of the plates, and this friction is insufficient to hold the type in the channel, and to provide a clamping action it is necessary to arrange the bearing-faces of the friction-plates so that their lower ends will be nearer the stationary side than the upper ends. Furthermore, it is necessary, because of the depressor-blade 137 reciprocating in this channel, to have the ends of the channel substantially in line, and so the stationary side 179 is given a slight convex curve, as shown in Fig. 25, whereby the lower end of the channel is directly below the receiving end, and in order that the friction-plate may clamp the type, as is necessary, I construct the friction-plates with a concave bearing-face, the radius of whose curve is slightly less than the radius of the curve of the stationary side, so that the lower end of the friction-plate approaches the stationary side. The upper ends of the friction-plates are made convex, so that they will force the type into the cut-away portion of the side 179, which is directly below the shoulders 172. In order to insure the type being sufficiently far out on the raceways, so that they will pass down into the assembling-channel, I mount on the central bracket 132 a cam-faced plate 181, which projects out over and rests on the inner ends of the raceways over the central channel, as is best shown in Fig. 31. In the latter figure a type is shown on the left-hand side in the position in which it may be left, and when a type in such a position is swept to the assembling-channel by the driver it will be moved out by its foot coming in contact with the cam-surface of the plate 181.

It will be seen from the foregoing description that the channel in which the type are assembled is centrally located and that the type are swept along on raceways on each side of the channel to this centrally-located channel, the drivers by their reciprocation bringing the type alternately from each side of the channel. The wing-cams are set on the driving-shaft 3 in such relation to the driver-moving mechanism that they will eject a type when the driver for the side of the machine at which the type is ejected is at its extreme limit of movement away from the channel, this extreme limit of movement of the driver being beyond the last type-channel, whereby it will be seen that no matter from what channel type are ejected they will be ejected in front of the driver on that side of the machine. It will of course be understood that this operation is repeated on the other side of the mechanism of the machine in reverse.

From the channel 97 the type may, if desired, be transferred line by line to any suitable justifying or other mechanism, as desired; but as this forms no part of the invention claimed in this application I will not refer to the same herein. I have indicated on the drawings a space-key which as far as the invention described and claimed in this application is concerned is connected to a lock of a forcer, and this forcer is released and operates to insert any suitable space in the same manner as the other keys on the keyboard.

While I have described what I believe to be the preferred form of my invention, it is of course obvious that many changes and substitutions might be made therein without departing from the scope of my invention, and I desire it to be understood that my invention includes all such substitutions and changes.

Having thus described my invention, what I claim as new, and desire to secure by Letters Patent, is—

1. In a type-setting machine, the combination with a type-channel of a forcer, means for maintaining pressure on the forcer to give it an initial movement, a lock restraining the initial-movement mechanism, means for releasing the lock and means independent of the lock for actuating the forcer after it has been given its initial movement.

2. In a type-setting machine, the combination with a series of type-channels, of a series of forcers, means for maintaining pressure on the forcers to give them an initial movement, a series of independent locks, one for each forcer, restraining the initial-movement mechanism, and means for releasing the locks.

3. In a type-setting mechanism, the combination with a series of type-channels, of a series of forcers, means for maintaining pressure on the forcers to give them an initial movement, a series of independent locks, one for each forcer, restraining the initial-movement mechanism, means for releasing the locks, and means independent of the locks for actuating the forcers after they have been given their initial movement.

4. In a type-setting machine, the combiscrew-threaded plug 151. By means of the screw-threaded plug 151 the tension of the spring 150 can be increased or diminished, as desired. 152 is a plug projecting from the side of the lever 140, against the top of which the block 149 rests. 153 is a screw passing through the end 146 of the lever 142 and provided with a lock-nut 154, this screw engaging the lower side of the lug 152 to hold the same in contact with the block 149. By this construction it will be seen that should the type-depressor strike an obstruction the connection between the levers 142 and 140 just described will allow a yield when the lever 142 is raised by the cam 144 and prevent any breakage of the parts.

In order to position the type accurately over the channel 97 in position to be depressed by the type-depressor and prevent the same from being carried too far by the type-drivers, I have provided the ends of the friction-bars with dogs 155 155. To accommodate the dogs 155 and to support the ends of the friction-bars at the center of the machine, the bars are longitudinally slotted, and the bottom of the slot at the extreme central ends of the bars is cut away for a short distance back from the ends to accommodate the heads of the dogs. The interior surfaces of the vertical walls of the slots are provided with longitudinal grooves 157 and 162, which are parallel to each other and with the friction-face of the bars. The grooves 157 are on the level of the bottom of the longitudinal slots in the friction-bars and the grooves 162 are located above the grooves 157.

The head 156 of each of the dogs 155 is provided with a vertical slot 210 in its front face and has extending rearwardly from the upper rear side of the head a plate 211. The lower forward edge of the head has a downwardly-projecting hook 212, which is of a height somewhat less than the width of the thinnest type, and the lower rear side of the head is beveled off at 213 to allow the type to pass under the head and into contact with the hook 212. The sides of the rearwardly-extending portions 211 of the head slide freely in ways 157 cut in the interior surfaces of the vertical walls of the friction-bars.

158 represents pins guided in ways formed in the block 159, secured to the front face of the guide 93. These pins project up from the posts 160, and to the lower ends of the posts 160 the friction-bars are removably secured by means of the feathers 161, carried on the posts 160, engaging the ways 162 in the friction-bars 98. The upper ends of the pins 158 are provided with nuts 163 to limit the downward movement of the pins. The lower ends of the posts 160 are bored out to receive plugs 164, which are normally pressed outward by means of the springs 165. The plugs 164 rest on top of the dogs 155 and hold them down against the face of the raceways. The heads of the dogs 155 are arranged to abut one against the other, so that when a type strikes one of the hooks 212 it will move the dog to which the hook is attached, as well as the opposite dog, to a position where the inner face of the hook which is struck by a type will exactly register with the farther side of the type-receiving channel. The type-depressor 137 is preferably formed of three fingers 167. The two outside fingers reciprocate on each side of the dogs and the center finger reciprocates in the channel formed by the vertical slots 210 in the heads of the dogs, the slots being opposite each other. By this construction the type-depressor can depress the type without disturbing the position of the dogs.

In the channel 98, in which the type are assembled, it is necessary to provide means for preventing the type from dropping to the bottom of the channel, and so becoming tilted, turned over, or disarranged. Preferably I use the means which I will now describe for accomplishing this result. Pivoted in a recess in the side of the channel is a shutter 168. This shutter is secured to a shaft 169 by means of the screw 170. Secured at one end to the shaft 169 is the spring 171, the other end of this spring resting against a stationary part of the machine. This spring is so arranged as to constantly tend to force the shutter up into a position at right angles to the channel at its upper end, and thus close the opening into the channel. On the same side of the channel with the shutter and on the upper edge of the channel is an overhanging lip or shoulder 172, the under surface of which is on the same level as the upper surface of the shutter when it is in its normal position. Pivoted at 166 in the wall of the channel opposite the shutter are mounted two plates 173, each provided with a shoulder 174 at their upper ends and opposite the shoulder 172. The face of the shoulders 174 are beveled, and these shoulders are of a slightly greater length than the shoulder 172, so that the under surface of these shoulders is on a lower plane than the under surface of the shoulder 172. The plates 173 are provided near their upper ends with elongated slots 175, through which pass the guide-pins 176 to guide the plates as they move back and forth. The upper ends of these plates are normally pressed forward by means of springs 177. These plates are also provided with a rearwardly-projecting portion 178 to give a long bearing-surface for the type in the raceway. It will be clearly seen from the detailed views when a type is forced into the channel by the depressor the shoulder 174 will press the type under the shoulder 172, and thus prevent the type from being lifted out of the channel by the shutter, the shutter being depressed by the entering type. The channel on the shutter side is curved, as clearly indicated in 179, Fig. 26.

moved by the drivers to the central channel. The parts are so positioned that the friction-bars 98 normally stand a distance from the raceways 28, which is slightly less than the thinnest type used.

116 represents a pair of shoes which are detachably connected to the drivers in a manner to be hereinafter described. These shoes are formed by the bottom 117 and two parallel vertical sides 118 118. The bottom 117 is thinner than the thinnest type used. The shoes rest upon and travel on the raceway 28. The friction-bar is supported so as to clear the bottom 117 of the shoes and stand between the sides 118 of the shoes. The sides 118 of the shoes are provided with notches 119 on their upper edges adapted to be engaged by the feet carried by the drivers, and 120 are plates which close the outer end of each of the notches. Pivoted to the type-drivers 90 91 at 121 are the feet 122. These feet are made in the form most clearly shown in Fig. 18 and are provided with downwardly-projecting lugs 123, which are adapted to engage the notches 119 in the sides 118 of the shoes. 124 124 are springs wound around the pivot 121, one end of each of the springs engaging a pin 125 of the drivers 90 91 and the other end engaging the feet 122 and constantly tending to force the feet into their vertical position. 126 are set-screws in the feet 122, which are adapted to abut against projections 127, carried by the drivers 90 91, and these screws limit the movement of the feet 122 and set the relation of the shoes to the type-channel. By this construction it will be seen that should a shoe 116 strike an obstruction or strike a type which is not fully ejected, the feet 122 will move back against the tension of the spring 124, raising the lug 123 of the foot out of the notch in the shoe and raise the shoe from the driver in the manner most clearly shown in Fig. 17.

128 is a projection on the face of each of the shoes 116, which is merely for the purpose of giving the shoe a longer bearing-face for the type when it is being carried by the shoe along the raceway to the channel 97.

Located immediately in front of the type-cases and on top of each of the raceways 28 are the type-guide bars 129, there being one of these type-guide bars on each of the raceways. In the under side of these type-guide bars are cut a series of notches 130, the notches being so cut that when the guide-bars are in position a notch will stand immediately in front of the lower end of each channel of the type-cases, and these notches differ from one another in height and are of a height slightly greater than the thickness of the type contained in the type-channel immediately behind the notch which is intended to be ejected through the notch. In Fig. 22 I have shown a cross-section of one of these guide-bars, and, as most clearly shown in this view, the rear side of each of the notches in the guide-bars is beveled off, as shown in Fig 131, to cause the type to pass easily and singly through the notches when they are ejected by a forcer. Preferably these guide-bars are removably secured in position in the manner shown more particularly in Figs. 20 and 21, and, as there shown, there are a pair of brackets 132, extending out from the front of the machine over each of the raceways. These brackets are provided with arms 133, the outer end of these arms being grooved at 134 to receive the reduced ends of the guide-bars.

135 are springs pivoted at 136 to the brackets, the ends of these springs being adapted to be swung over the top of the guide-bars after the same have been inserted in the grooves in the arms 133 of the brackets and hold the guide-bars firmly in position. In Figs. 20 and 21 I have shown in full lines these springs 135 in the position they occupy when holding the guide-bars in place and in dotted lines the position to which they are swung when the guide-bars are to be removed. In Fig. 20 I have also shown in dotted lines the manner in which a guide-bar is lifted to remove the same from the machine.

Referring now to Figs. 4, 23, and 24, 137 indicates the type-depressor, which forces the type into the central channel when they are delivered off the channel by the drivers. The depressor 137 is carried on a slide 138, guided in ways which are attached to the rear side of the bar 94 at its center. Referring to Fig. 2, 208 is a block provided with a vertical slot, and 209 are two plates secured to the block 208, one on each side and each extending slightly over the central slot. In the guide thus formed is fitted the T-shaped slide 138, carrying the type-depressor at its lower end and connected at its upper end to the lever 140, pivoted on the pivot 141, which is mounted in a bracket 215, secured to the cross-bar 30. 142 is a second lever, also pivoted on the pivot 141, and this lever carries the cam-roller 143, running on the cam 144, fast on the main shaft 3, formed on the collars 9. The cam 144 has two raised portions thereon, which are diametrically opposite each other, whereby the lever 144 will be operated twice during every revolution of the shaft 3. 145 is a spring, one end of which is connected to the lever 142 and the other end to a suitable bracket on the frame of the machine, this spring holding the cam-roller 143 of the lever 142 in contact with the cam 144. The end 146 of the lever 142 is preferably projected upward at 147, and this upward projection is bored at 148 to receive the sliding block 149, which is held in positon by the spring 150, one end of this spring preferably passing into the interior of the block 149, as shown, and the other end thereof resting against the adjustable nation with a series of type-channels of a series of type-forcers, one for each channel, means normally held under tension to give the forcers their initial movement, a lock normally holding the forcers in their retracted position, means to release the lock and allow the forcers to be given their initial movement, constantly-operating means adapted to actuate the forcers when they have been given their initial movement to eject the type from one of the channels and means set by the actuation of the forcer to return the forcer to its retracted position where it is held by the lock.

5. In a setting mechanism, the combination with a series of type-channels of a series of forcers, one for each channel, a series of locks normally holding said forcers in their retracted position, a spring-actuated device for each forcer constantly tending to give the forcer its initial movement, a constantly-rotating cam adapted to engage the forcer when it has been given its initial movement to actuate the forcer so as to eject type from a channel, and means to then return the forcer to its retracted position where it is held by the lock.

6. In a type-setting machine, the combination with a series of type-channels of a series of type-forcers, one for each channel, means normally held under tension to give the forcers an initial movement, a lock normally holding the forcers in their retracted position, means to release the lock and allow the forcers to be given their initial movement, constantly-operating means adapted to engage the forcers when they have been given their initial movement to actuate the forcer so as to eject type from a channel, and spring-actuated means to then return the forcers to their initial position where they are held by the lock.

7. In a type-setting machine, the combination with a series of type-channels of a series of forcers, one for each channel, a series of locks normally holding the forcers in their retracted position, a spring-actuated device for each forcer constantly tending to give the forcer its initial movement, a constantly-rotating cam adapted to engage the forcer when it has been given its initial movement and actuate it so as to eject type from a channel, and spring-actuated means to return the forcer to its retracted position, where it is held by the lock, the spring of said returning means being stronger than the spring of the means for giving the forcer its initial movement.

8. In a type-setting mechanism, the combination with a series of type-channels of a series of forcers for moving the type from the channels, of means for actuating the forcers, and spring-supported guides adapted to support and guide the rear end of the forcers and prevent lateral movement.

9. In a type-setting mechanism, the combination with a series of type-channels of a series of forcers for moving the type from the channels, of a rotating cam for actuating the forcers, and spring-supported guides adapted to support and guide the rear end of the forcers and prevent lateral movement.

10. In a type-setting mechanism, the combination with a series of forcers of a series of yielding guides, one for each forcer, adapted to yieldingly support said forcers.

11. In a setting mechanism, the combination with a series of forcers of a bar, a series of yielding guides, one for each forcer, mounted on said bar and adapted to yieldingly support said forcers.

12. In a type-setting mechanism, the combination with a series of forcers of a bar, a series of guides, one for each forcer, mounted on said bar, springs interposed between said bar and said guides, said guides being adapted to yieldingly support and guide said forcers.

13. In a setting mechanism, the combination with a series of forcers of a series of yielding guides, one for each forcer, adapted to yieldingly guide said forcers, and means for limiting the yielding movement of said guides.

14. In a setting mechanism, the combination with a series of forcers of a bar, a series of guides, one for each forcer, mounted on said bar, and adapted to yieldingly guide said forcers, and means for limiting the yielding movement of said guides.

15. In a type-setting mechanism, the combination with a series of forcers of a series of guides, one for each forcer, having grooves in their upper surface, each adapted to receive and guide one of said forcers, and means for yieldingly supporting said guides.

16. In a setting mechanism, the combination with a series of forcers of a series of guides, each provided with grooves in its upper surface, each adapted to receive and guide one of said forcers, of a bar upon which said guides are yieldingly mounted.

17. In a setting mechanism, the combination with a series of forcers of a series of guides, one for each forcer, a bar upon which said guides are mounted, means for allowing said guides to yield in a vertical plane only, whereby said forcer may yield vertically but can have no lateral movement.

18. In a setting mechanism, the combination with a series of forcers of a series of guides, one for each forcer, provided with grooves cut in their upper face, said forcers being mounted in said grooves, means for reciprocating said forcers in said grooves, means for allowing said guides to yield in a vertical plane only, whereby said forcers may yield vertically but can have no lateral movement.

19. In a setting mechanism, the combination with a series of forcers of a series of locks, one for each forcer; a lock-operating rod adapted to engage any one of a plurality of locks; and means for shifting the rod from one lock to an adjacent lock.

20. In a setting mechanism, the combination with a series of forcers of a series of locks, one for each forcer; a lock-operating rod adapted to engage any one of a plurality of locks, and a pivoted lever engaging the lock-operating rod and adapted to shift the operating-rod from one lock to an adjacent lock.

21. In a setting mechanism, the combination with a series of forcers of a series of locks, one for each forcer and independent of the forcer, and a series of rods independent of the locks and each adapted to operate a lock and means to actuate the forcers independent of the locks.

22. In a setting mechanism, the combination with a series of forcers of a series of locks, one for each forcer, a series of rods independent of the locks each adapted to operate a lock, and a series of springs independent of the locks and each adapted to engage a lock.

23. In a setting mechanism, the combination with a series of forcers, of a series of locks, one for each forcer, and independent of forcer, a series of rods independent of the locks and each adapted to operate a lock, and a series of springs independent of the locks and each adapted to engage a lock.

24. In a setting mechanism the combination with a series of forcers of a series of locks, one for each forcer, each lock consisting of a plate guided in a suitable way, each plate having a shoulder on its side adapted to engage the top surface of a forcer, the lower end of the plate extending down between the forcers below their lower surfaces; a series of lifting-rods, each rod being adapted to engage the lower end of a lock to operate the same.

25. In a setting mechanism, the combination with a series of forcers of a series of locks, one for each forcer, each lock consisting of a plate guided in a suitable way and depressed by an independent spring, each plate having a shoulder on its side adapted to engage the top surface of a forcer, the lower end of the plate extending down between the forcers below their lower surfaces; a series of lifting-rods each rod being adapted to engage the lower end of a lock to operate the same.

26. In a composing-machine, the combination with a series of type-channels of a series of forcers adapted when actuated to eject type from said channels, a shaft, means for rotating said shaft, a pair of collars loose on said shaft, a cam adapted to actuate said forcers secured to said collars, a collar fast on said shaft adjacent to one of said pair of collars, a spring-pressed pin carried by one of said adjacent collars, and a socket in the other of said adjacent collars adapted to be engaged by said spring-pressed pin, whereby said cam carried by said pair of collars will normally be driven with said shaft; but should said cam meet with abnormal resistance, said cam will be loosed from said shaft.

27. In a type-setting machine, the combination with a raceway, means for projecting type on to the raceway, a driver reciprocating over the raceway, a shoe detachably secured to the driver traveling on the raceway, whereby, when the shoe encounters abnormal resistance at any point of its path of motion, it will be released from the driver.

28. In a type-setting machine, the combination with a raceway of means for projecting type on to the raceway, a driver reciprocating over the raceway, a shoe traveling on the raceway, and a spring-actuated foot detachably securing the shoe to the driver.

29. In a type-setting machine, the combination with a raceway of means for projecting type on to the raceway, a driver reciprocating over the raceway, a shoe traveling on the raceway, and a pivoted foot for detachably securing the shoe to the driver.

30. In a type-setting machine, the combination with a raceway of means for projecting type on to the raceway, a driver reciprocating over the raceway, a shoe traveling on the raceway, and a pivoted spring actuated for detachably securing the shoe to the driver.

31. In a type-setting machine, the combination with a raceway of means for projecting type on to the raceway, a driver reciprocating over the raceway, a shoe traveling on the raceway, a foot pivoted to the driver detachably securing the shoe to the driver, a spring pressing the foot forward, and an adjusting device to set the angle of the foot to the driver, the heel of the foot engaging and driving the shoe.

32. In a type-setting machine, the combination with two type-raceways of a type-receiving channel located between the adjacent ends of said raceways, a reciprocating driver to drive the type alternately to the central channel, friction-bars suitably supported over the raceways, one on either side of the central channel, two dogs with abutting ends mounted on each of the adjacent ends of the friction-bars in suitable ways to move horizontally to arrest the movement of the type at the central channel and to continue the restraining resistance on the type for the full throw of the drivers, and spring-pressed blocks adapted to rest on top of the dogs to hold the same yieldingly in position.

33. In a type-setting machine, the combination with a type-receiving channel having a stationary side and a yielding side, the normal distance between the stationary and the yielding side varying at the different points in the channel, whereby when there are a plurality of type in said channel the first one of the type to enter the channel will always be held between the yielding and stationary sides of the channel.

34. In a type-setting machine, the combination with a type-receiving channel having a stationary side of a curved yielding side, whereby the first one of a plurality of type to enter the channel will always be held between the said stationary and said yielding sides.

35. In a type-setting machine, the combination with a type-receiving channel having a stationary curved side of a yielding curved side opposite said stationary side, whereby the first one of a plurality of type to enter the channel will always be securely held between said stationary and said yielding sides.

36. In a type-setting machine, the combination with a type-receiving channel having a curved stationary side of a curved yielding side, the curve of said yielding side having a shorter radius than the curve of said stationary side, the curve of one of said sides being generally convex and the other side generally concave, whereby the first one of a plurality of type to enter the channel will always be securely held between the stationary and yielding sides of said channel.

37. In a type-setting machine, the combination with a type-receiving channel having a curved stationary side and a curved yielding side, the curve of one of the sides having a shorter radius than the curve of the other side.

38. In a type-setting machine, the combination with a raceway of a type-receiving channel located at the end of the raceway, a reciprocating lever reciprocating over said raceway and adapted to drive type to the channel, means for ejecting type on to the raceway, and means located on the raceway to move the type across the raceway while they are being moved to the receiving-channel by the driver.

39. In a type-setting machine, the combination with two raceways of a type-receiving channel located between the adjacent ends of the said raceways, a reciprocating driver to move the type along the raceways to the central channel, means to eject type on to the raceways, and means to move the type transversely of the raceways while they are being swept along by the reciprocating driver.

Signed by me at Baltimore, Maryland, this 6th day of June, 1902.

ALEXANDER DOW.

Witnesses:
 HOWARD D. ADAMS,
 E. R. BERKELEY.